(12) United States Patent
Wang et al.

(10) Patent No.: US 12,058,777 B2
(45) Date of Patent: Aug. 6, 2024

(54) ADAPTIVE USER EQUIPMENT CAPABILITY REPORTING

(71) Applicant: AT&T Intellectual Property I, L.P., Atlanta, GA (US)

(72) Inventors: Ruifeng Wang, Bellevue, WA (US); Yupeng Jia, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 322 days.

(21) Appl. No.: 17/535,326

(22) Filed: Nov. 24, 2021

(65) Prior Publication Data
US 2023/0164546 A1   May 25, 2023

(51) Int. Cl.
*H04W 8/24*   (2009.01)
*G06N 20/00*   (2019.01)
*H04W 72/21*   (2023.01)
*H04W 88/12*   (2009.01)

(52) U.S. Cl.
CPC ............. *H04W 8/24* (2013.01); *H04W 72/21* (2023.01); *H04W 88/12* (2013.01); *G06N 20/00* (2019.01)

(58) Field of Classification Search
CPC ....... H04W 8/24; H04W 72/21; H04W 88/12; H04W 8/22; H04W 76/10; H04W 72/23; H04W 72/04; H04W 76/27; H04W 28/06; H04W 28/18; H04W 24/10; G06N 20/00; H04L 5/001
See application file for complete search history.

(56) References Cited

U.S. PATENT DOCUMENTS

| | | | |
|---|---|---|---|
| 11,528,596 B2 * | 12/2022 | Quan | H04W 72/56 |
| 2016/0262053 A1 * | 9/2016 | Palm | H04W 48/16 |
| 2018/0084539 A1 * | 3/2018 | Kubota | H04W 72/51 |
| 2019/0200212 A1 * | 6/2019 | Quan | H04W 76/10 |
| 2021/0211865 A1 * | 7/2021 | Li | H04L 69/04 |
| 2021/0219128 A1 * | 7/2021 | Wu | H04W 28/065 |
| 2022/0078605 A1 * | 3/2022 | Alnås | H04W 8/24 |

FOREIGN PATENT DOCUMENTS

| | | | | |
|---|---|---|---|---|
| WO | WO-2018039974 A1 * | 3/2018 | | H04W 72/04 |
| WO | WO-2019238065 A1 * | 12/2019 | | |

* cited by examiner

*Primary Examiner* — Matthew C Sams

(57) ABSTRACT

Adaptive user equipment capability reporting is disclosed. Continuing increases in the number of radio access technologies and more granular division of radio spectrum can result in a conventional user equipment capability report exceeding a threshold size, such as a threshold size set by a standards organization. In response, a conventional user equipment capability report can be truncated, which can result in loss of valuable user equipment capability information. The disclosed subject matter provides for generating an adapted user equipment capability report that can be smaller than the conventional user equipment capability reports in response to receiving an oversize user equipment capability report. The adapted user equipment capability report can intelligently comprise a preferred user equipment capability and can segregate reported capabilities by radio access technology. This can avoid loss of user equipment capability information corresponding to the preferred user equipment capability comprised in the adapted user equipment capability report.

20 Claims, 10 Drawing Sheets

ADAPTIVE USER EQUIPMENT CAPABILITY REPORTING

TECHNICAL FIELD

The disclosed subject matter relates to adapting user equipment (UE) capability reporting and, more particularly, to adapting UE capability reporting to mitigate effects corresponding to UE capability reports that exceed a threshold UE capability report size.

BACKGROUND

Conventional UE capability reporting generally employs a Radio Resource Control (RRC) message. A mobile network standard can designate a UE capability report size limit. A typical example of UE capability reporting size limit is 8188 bytes, e.g., as is currently designated by the 3rd Generation Partnership Project (3GPP) specification at 36.323. However, as an increasing number of radio access technologies (RATs) are being deployed, it is becoming increasingly common for UEs trying to report available capabilities to generate UE capability reports that can exceed a threshold size limit. In this regard, UEs listing many carrier aggregation (CA) and dual connectivity band combinations across many RATs can result in long UE capability reports. When an oversize UE capability report is communicated to network equipment deployed by a mobile network operator (MNO), the oversize UE capability report can be problematic. In a first example of conventional technology, an MNO can adhere to a standardized UE capability reporting size limit, which can result in a loss of some capability information, e.g., the first 8188 bytes of UE capability report data can be consumed by MNO equipment and any excess data of the UE capability report are typically discarded, which can result in the loss of some UE capability information contained in the discarded portion of the UE capability report. In a second example, an MNO can deviate from a standardized UE capability reporting size and accept oversize UE capability reports, however this can entail adapting network equipment to accept a UE capability report that does not comply with the given standard. Moreover, in this second example, deviation from the standard can increase the complexity of interacting with networks of other MNOs, can cause errors with other components of a network of the MNO that can be expecting a standardized UE capability report, etc. As such, it can be appreciated that management of an oversize UE capability report can increase costs and complexity of a MNO's network. Adaptive UE capability reporting, as disclosed herein, can provide improvements to the current state of the art in regard to UE capability reporting.

DETAILED DESCRIPTION

Figure 1:
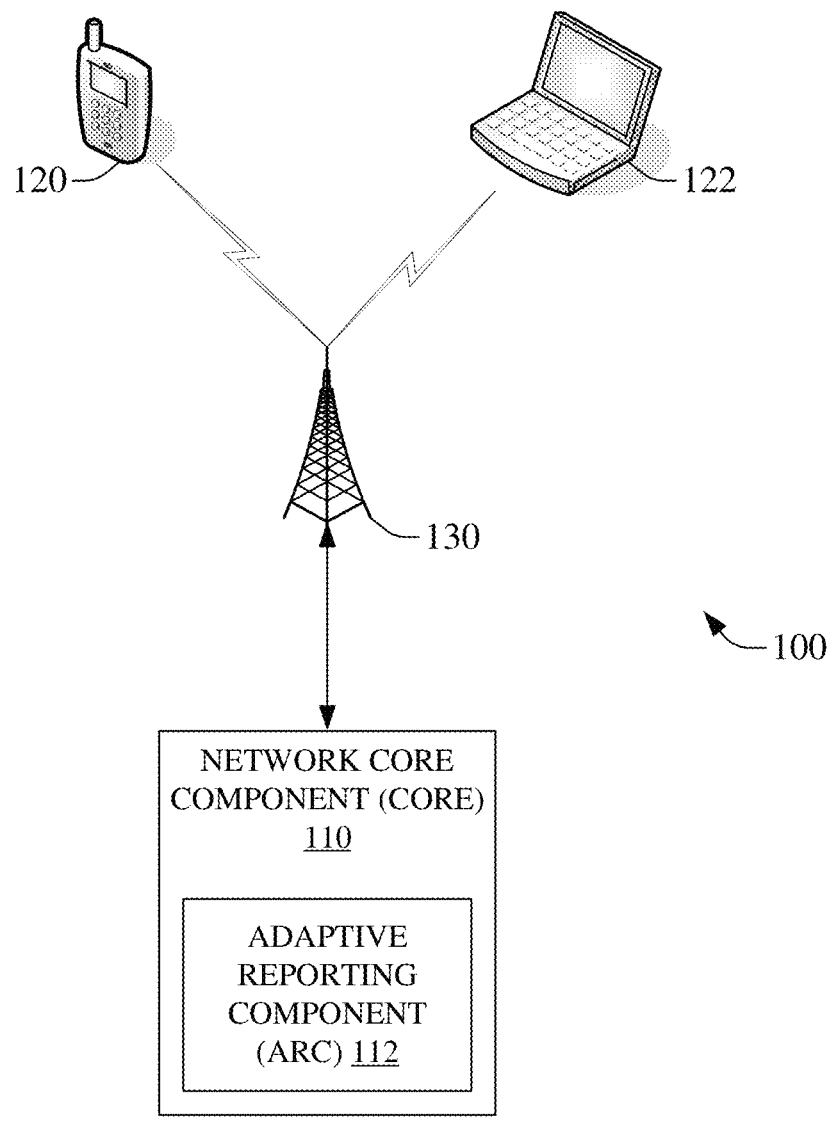
FIG. 1 is an illustration of an example system that can facilitate adaptive user equipment capability reporting, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As is noted elsewhere herein, a UE capability report that exceeds a threshold size can be problematic for a mobile network. Where modern mobile devices can employ an increasing number of RATs, channels within a given RAT, etc., the reporting of UE capabilities, e.g., via a UE capability report, are increasingly exceeding standardized threshold UE capability reporting size limits, resulting in an oversized UE capability report. An oversized UE capability report can force a MNO to modify their network equipment to use the oversized report, or loss of capability information can result from truncating an oversized UE capability report.

Adaptive UE capability reporting can mitigate the effects of oversized UE capability reports. In an aspect, a UE capability report structure with modern UEs and modern mobile networks can be highly complex, though generally, UE capability information is contained in a UE capability report that is in the form of an RRC message sent to a mobile network during initial registration of a UE to the mobile network. The UE capability report typically comprises information that indicates details of a UE's radio capabilities. These radio capabilities, as more features are added to UEs and/or mobile networks, are similarly increasing and the UE capability report is becoming longer and more complicated. It is therefore increasingly common for the radio capabilities of a UE capability report to cause the UE capability report to exceed a threshold size, e.g., resulting in an oversized report. Adaptive UE capability reporting can detect an oversized report and indicate reduced capability reporting, e.g., indicate that the size of the UE capability report should be reduced relative to a given threshold size.

An indication of reduced capability reporting can result in a UE re-reporting capabilities via an adapted UE capability report that has been reduced in size relative to a given threshold size. However, where the reduction of an oversized report results in an adapted report that is not oversized, some consideration of how the capabilities are being reported can be important. As an example of conventional technology, as noted elsewhere herein, an oversized report can be truncated by mobile network equipment, which can result in a loss of some UE capability information. In this example, using the presently disclosed technology to indicate reduced capability reporting that causes the UE to send an adapted report that is within a given report size threshold can be valuable. However, where this example report simply truncates some UE capability information included in the adapted report, there can be little difference in the loss of capability information from the conventional truncation of an oversized report by the mobile network equipment, e.g., chopping off the excessive capability information at the UE can be very similar to chopping off that same excessive capability information at the mobile network equipment. In this regard, merely reducing the size of the UE capability report can be of little practical benefit. As such, reducing the size of the UE capability report, e.g., via adaptive UE capability reporting, can benefit from intelligently adapting capability reporting to bring the UE capability reporting size within a prescribed size limit while endeavoring to preserve capabilities information that can be regarded as having more importance, greater preference, etc. As an example, a preferred UE capability can be included in a portion of an oversized report that would be truncated by mobile network equipment. In this example, reduced capability reporting can be indicated in response to the UE capability report being determined to be oversized. This indication can cause the UE to re-report an adapted UE capability report that can be within size limits. In this example, the UE can truncate capability information in a manner that retains reporting of the example preferred UE capability. As such, in this example, the preferred UE capability can be lost where the mobile network conventionally truncates an oversized report, but, where the UE is caused to send an adapted report, the preferred UE capability can be retained by intelligently prioritizing reporting of the preferred UE capability in the adapted report.

In embodiments of the disclosed subject matter, adaptive UE capability reporting can cause a UE to report an adapted report. In some embodiments, an adapted report can generationally separate capabilities. As an example, an adapted report can separate indications of $4^{th}$ generation long term evolution (4G LTE) RAT capabilities from indications of $5^{th}$ generation new radio (5G NR) RAT capabilities in an adapted report. This can be contrasted with some conventional UE capability reports that can intermix the reporting of these different generations of RAT capabilities.

In some embodiments, a learning tool can be employed to determine preferred UE capabilities. A learning tool can be, for example, artificial intelligence (AI), machine learning (ML), deep learning, another learning system, or combinations thereof. As an example, a learning tool can employ a machine learning technique to determine a group of most radio capabilities for a mobile network area based on historical connections with UEs in that mobile network area. In this example, some radio capabilities may perform better than other radio capabilities because of the particular features of the wireless network area in different deployment scenarios. More realistically, a learning tool is likely to indicate more preferable channels within a given RAT generation, e.g., some 4G carriers may outperform other 4G carriers for a given mobile network area, and these preferred, better performing, 4G carriers can be prioritized over the lesser performing 4G channels in an adapted UE capability report. Similarly, combinations of channels, carrier aggregation (CA) of UE capabilities, etc., can similarly be analyzed via learning tools to determine preference for a given UE capability in regard to reporting via an adapted UE capability report. Determining preference for a UE capability can be embodied in sorting, ordering, ranking, etc., of UE capabilities that can be included in a UE capability report, for example, facilitating intelligent truncation of lower ranked UE capabilities from a UE capability report such that a resulting adapted UE capability report can include higher ranked UE capabilities.

In some embodiments, some information included in conventional UE capability reports can be redundant. As an example, groups of UE radio capabilities can be used as a shorthand to report UE capabilities with less verbosity. However, in this example, different groups can have overlapping capabilities, which can result in redundancy that can unnecessarily add to UE capability reporting size. As an example, group A can comprise channels 1-5, group B can comprise channels 6-8, and group C can comprise channels 4-10. In this example, reporting 'groups of channels A, B, and C,' can be more byte-efficient in a UE capability report than reporting 'channels 1-5, 6-8, and 4-10.' However, in this example, all of channels 1-10 can be reported as being capabilities of the UE by only reporting groups A and C. In this example, group B can be regarded as redundant and reporting group B can unnecessarily consume UE capability report space. Where the example UE capability report is oversize, and groups A, B, and C are reported, group C can be lost due to message truncation. However, an adaptive reporting component (ARC) of a mobile network, according to the presently disclose subject matter, can intelligently adapt a received oversized UE capability report. In an example, receiving groups A and B, as above, can be within size limits. However, where the size limit is exceeded by including reporting of group C, the example ARC can analyze the oversized report and determine that reporting of group B is redundant. Accordingly, the example ARC can generate an adapted UE capability report that excludes group B to reduce the size of the adapted report in comparison to the oversized report. This can result, for example, in the adapted report being within size standards. As such, the example ARC can substitute the adapted report for the oversized report, avoiding loss of UE capability information, e.g., only redundant information was discarded, while also avoiding modification of the mobile network to use an oversized UE capability report. In some embodiments of the presently disclosed subject matter, an example ARC can similarly intelligently truncate an oversized UE capability report into an adapted UE capability report by retaining more preferred UE capabilities from the oversized report into the adapted report. As is noted elsewhere herein, selection of preferred UE capabilities can be via a learning tool and can result in ordering, rankings, sorting, etc., of UE capabilities to facilitate retention of preferred UE capabilities, e.g., retention of UE capabilities of a higher rank, etc. In some embodiments, a learning tool can be employed at the carrier-side, at the UE-side, or a combination thereof, to enable adapting UE capability reporting.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate adaptive user equipment capability reporting, in accordance with aspects of the subject disclosure. System 100 can comprise network core component (core) 110 that can be comprised in a carrier core network. A carrier can also be referred to as a mobile network operator (MNO) and the carrier core network can be a mobile core network operated by the carrier or MNO. Core 110 can facilitate communications via radio access network component(s) 130. Accordingly, in example system 100, a user equipment, for example mobile phone 120, computer 122, etc., can connect over a wireless link to a wireless network supported by core 110, e.g., via RAN component 130. An example of this type of connectivity can be connecting a laptop computer having wireless connection hardware to a modern wireless network, for example, a cellular network operated by a national wireless carrier.

Core 110 can comprise adaptive reporting component (ARC) 112 that can enable adaptive UE capability reporting. As has been noted, UE reporting of radio capabilities of the UE can be part of the process of establishing a connection between the UE, for example phone 120, laptop computer 122, etc., and the RAN component 130 of a mobile network operated by an MNO. In this regard, implementation of a connection can be based on reported UE capabilities. As an example, a UE reporting capability to communicate via channel A, and RAN component 130 also being capable of communicating via channel A, can result in establishing a connection between the UE and RAN component 130 via channel A. UE capability reporting is typically via an RRC message. UE capability reporting messages, e.g., UE capability reports, etc., can generally be limited to a designated maximum size, such as by a standards organization. Whereas continued development of wireless networks and devices designed to attach to those networks is resulting in an increased number of radio access technologies (RATs), and where channels in these RATs are able to be combined, the UE capability report size can act as a limiting factor in regard to reporting all possible UE capabilities. As an example, providing a list of UE capabilities via a UE capability report for just a few channels of a single RAT can, in some instances, easily fit in a UE capability report comporting with a standards designated maximum report size, e.g., 8188 bytes, etc., as was the case for many legacy mobile networks and earlier generations of UEs. However, the same maximum report size can now result in UE capability reports that report all possible capabilities, which can now include many channels across many different RATs, to be bigger than the maximum report size permitted by a standards organization, e.g., oversize reports.

An oversize report can result in either non-standard modification of a network to accept oversize reports, which can lead to increased expense, compatibility issues, etc., or loss of information indicating some portion of the total UE capabilities being reported, e.g., truncation of the oversize report can result in loss of some UE capability information in the truncated portion of the UE capability report. ARC 112 can provide an indication of reduced UE capability reporting. The indication can be based on determining that a UE capability report exceeds a designated size threshold.

In some embodiments, indicating reduced UE capability reporting can result in the UE subsequently transmitting an adapted UE capability report that can be smaller than a previous UE capability report, e.g., the indicating reduced UE capability reporting can cause retransmission of an adapted UE capability report that can comprise less capability information than the UE capability report that cause the indicating of the reduced UE capability reporting. In an aspect, determining that a first report is an oversized report can result in indicating that the report was oversized and can cause a second report that is smaller, e.g., an adapted report, wherein the adapted report can comprise less capability information than the oversized report. It is noted that an adapted report can comprise preferred UE capability information, e.g., information that can identify preferred UE capabilities. This can result in the adapted report being smaller than the oversized report while still indicating preferred UE capabilities. This also avoids the adapted report being the same as, or similar to, core 110 merely truncating the oversized report without consideration of preferred UE capabilities, as is discussed elsewhere herein.

In some embodiments, indicating reduced UE capability reporting can result in ARC 112 generating an adapted UE capability report based on the received oversized UE capability report. In these embodiments, the UE can communicate oversized reports that can be managed on the carrier-side components, e.g., core 110, ARC 112, etc., to generate a smaller, size-compliant, adapted UE capability report that can then be employed by other network components as if it were a size-compliant UE capability report. This can be understood as ARC 112 intercepting an oversized report and generating an adapted report to substitute for the oversized report. In this regard, ARC 112 can populate the resulting adapted report with preferred UE capabilities indicated in the oversized report. As such, the resulting adapted report can comprise preferred UE capabilities that may have been lost where the oversized report would be conventionally just truncated upon reaching a threshold size. In an example, if a preferred UE capability is comprised in a conventionally truncated portion of an oversized report, then this preferred UE capability information can be lost in the truncated portion of the oversized report. However, where ARC 112 can generate an adapted report, the preferred UE capability can be retained, and some other less preferred UE capability can be discarded in reducing the adapted report based on the threshold maximum UE capability report size.

Embodiments of the disclosed subject matter can employ learning tools, e.g., artificial intelligence (AI) technology, machine learning (MI) technology, deep learning technology, etc., to determine preferred UE capabilities. In some embodiments, this can be performed via ARC 112. As an example, an oversized report can be used to generate a size-compliant adapted report comprising preferred UE capability information determined from the oversized report. In some embodiments this can be performed via a UE-side processor. As an example, a UE can respond to an indication of reduced UE capability reporting to generate a size-compliant adapted report comprising preferred UE capability information. In other embodiments, learning tools can be employed by both carrier-side and UE-side processors. As an example, an oversized report can be used to generate a size-compliant adapted report comprising preferred UE capability information determined from the oversized report, and an indication of reduced UE capability reporting can cause the UE to employ learning tools to generate future UE capability reports that can be size compliant. It is noted that these examples are non-exhaustive and other examples are to be considered within the scope of the instant disclosure even though they are not explicitly recited for the sake of clarity and brevity.

In some embodiments, an adapted report can identify UE resources according to a technological generation, e.g., 4G LTE capabilities can be separated from 5G NR capabilities in an adapted UE capability report. Moreover, ARC 112 can facilitate switching between a standalone (SA) configuration and a non-standalone (NSA) configuration of connections(s) between a UE and a mobile network. In this regard, an SA configuration, for example, can employ only 5G NR capabilities, while a NSA configuration can provide some 5G features via 4G LTE capabilities. NSA configurations can generally employ carrier aggregation (CA) technology that can leverage the large numbers of UE capabilities that are present on modern devices. As such, determining preferred UE capabilities, for example via a learning tool, can comprise determining a preference for UE resources that can facilitate employment of more component carriers (CCs) and more multiple input-multiple output (MIMO) layers. In an example, a first adapted report that identifies UE capabilities that support more CCs and MIMO layers for a 4G LTE RAT can be favored over a second adapted report that does identifies UE capabilities that support fewer CCs and MIMO layers. In this example, where a 5G NR connection with a UE is released, establishing 4G LTE connections according to the example first adapted report are typically going to perform better due to the greater CCs and MIMO layer availability than connections according to the example second adapted report that can fail to indicate UE capabilities that support as many CCs and MIMO layers.

Figure 2:
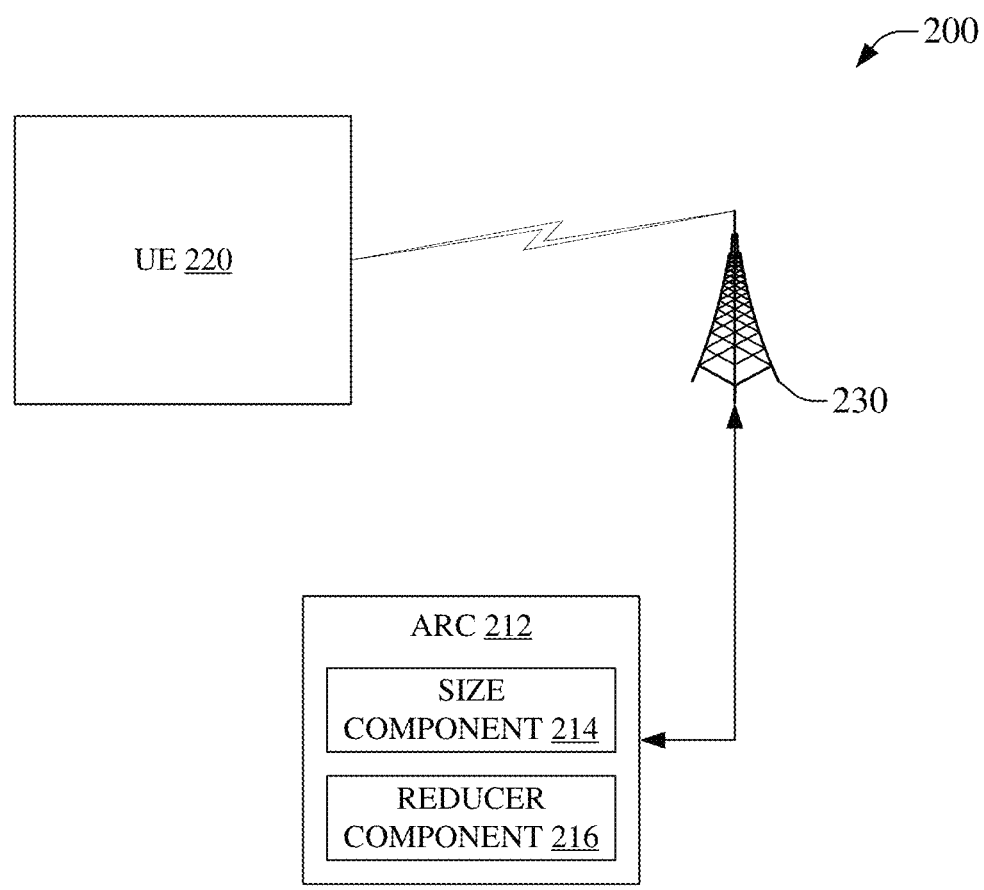
FIG. 2 is an illustration of an example system that can facilitate adaptive user equipment capability reporting enabling reducing a size of a capacity report, in accordance with aspects of the subject disclosure.

FIG. 2 is an illustration of a system 200, which can enable adaptive user equipment capability reporting enabling reducing a size of a capacity report, in accordance with aspects of the subject disclosure. System 200 can comprise ARC 212 that can be comprised in a core network of an MNO. UE 220 can employ a wireless connection for communications via RAN component 230 to a mobile network of an MNO, wherein the mobile network can comprise a core network. Accordingly, in example system 200, UE 220 can wirelessly connect to a MNO network via RAN component 230. As part of establishing the wireless connection, UE 220 can transmit an RRC message that can be a UE capability report. ARC 212 can enable adaptive UE capability reporting. Implementation of a connection(s) to UE 220 can be based on reported UE capabilities.

UE capability reporting messages, e.g., UE capability reports, etc., can generally be limited to a designated maximum size, such as by a standards organization. As mobile technology continues to evolve, a count of supported RATs, channels of RATs, etc., continues to rise, which can result in occurrences of the UE capability report size exceeding a threshold message size, e.g., a maximum size designated by a standards organization, etc., resulting in oversized UE capability reports. Oversized UE capability reports can result in loss of some UE capability information via indiscriminate truncation of an oversize report. ARC 212 can provide an indication of reduced UE capability reporting. The indication can be based on determining that a UE capability report exceeds a designated size threshold. This determination can be made at size component 214. In this regard, UE capability reports that are not determined to be oversized by size component 214 can be employed in the conventional manner, e.g., if the message isn't oversized, the network is already typically designed to accept a size-compliant UE capability report. However, where size component 214 determines that a first UE capability report is oversized, based on a threshold report size, then ARC 212 can indicate reduced UE capability reporting.

In some embodiments, reducer component 216 of ARC 212 can signal the UE to transmit an adapted UE capability report that can be smaller than a previous UE capability report, e.g., the indicating reduced UE capability reporting can cause reducer component 216 to signal UE to transmit an adapted UE capability report that can comprise less capability information than the UE capability report that caused the indicating of the reduced UE capability reporting. It is noted that an adapted report can comprise preferred UE capability information, e.g., information that can identify preferred UE capabilities. This can result in the adapted report being smaller than the oversized report while still indicating preferred UE capabilities. This also avoids the adapted report being the same as, or similar to, core 210 merely truncating the oversized report without consideration of preferred UE capabilities, as is discussed elsewhere herein.

In some embodiments, reducer component 216 of ARC 212 can generate an adapted UE capability report based on the received oversized UE capability report. In these embodiments, the UE can communicate oversized reports that can be managed on the carrier-side components, e.g., via reducer component 216, etc., to generate a smaller, size-compliant, adapted UE capability report that can then be employed by other network components as a size-compliant UE capability report. This can be understood as ARC 212 intercepting an oversized report and generating, via reducer component 216, an adapted report to substitute for the oversized report. Reducer component 216 can populate an adapted report with preferred UE capabilities based on the oversized report. As such, the resulting adapted report can comprise preferred UE capabilities that may have been lost where the oversized report would be conventionally just truncated upon reaching a threshold size. In various embodiments of the disclosed subject matter, as previously noted, learning tools, e.g., artificial intelligence (AI) technology, machine learning (MI) technology, deep learning technology, etc., can be employed to determine preferred UE capabilities. In some embodiments, this can be performed via reducer component 216, via other unillustrated components of ARC 212, etc. In some embodiments this can be performed via a UE-side processor. In other embodiments, learning tools can be employed by both carrier-side and UE-side processors.

In some embodiments, an adapted report can identify UE resources according to a technological generation, e.g., 4G LTE capabilities can be separated from 5G NR capabilities in an adapted UE capability report. Moreover, ARC 212 can facilitate switching between a standalone (SA) configuration and a non-standalone (NSA) configuration of connections(s) between a UE and a mobile network. In this regard, an SA configuration, for example, can employ only 5G NR capabilities, while a NSA configuration can provide some 5G features via 4G LTE capabilities. NSA configurations can generally employ carrier aggregation (CA) technology. As such, determining preferred UE capabilities, for example via a learning tool, can comprise determining a preference for UE resources that can facilitate employment of more component carriers (CCs) and more multiple input-multiple output (MIMO) layers.

Figure 3:
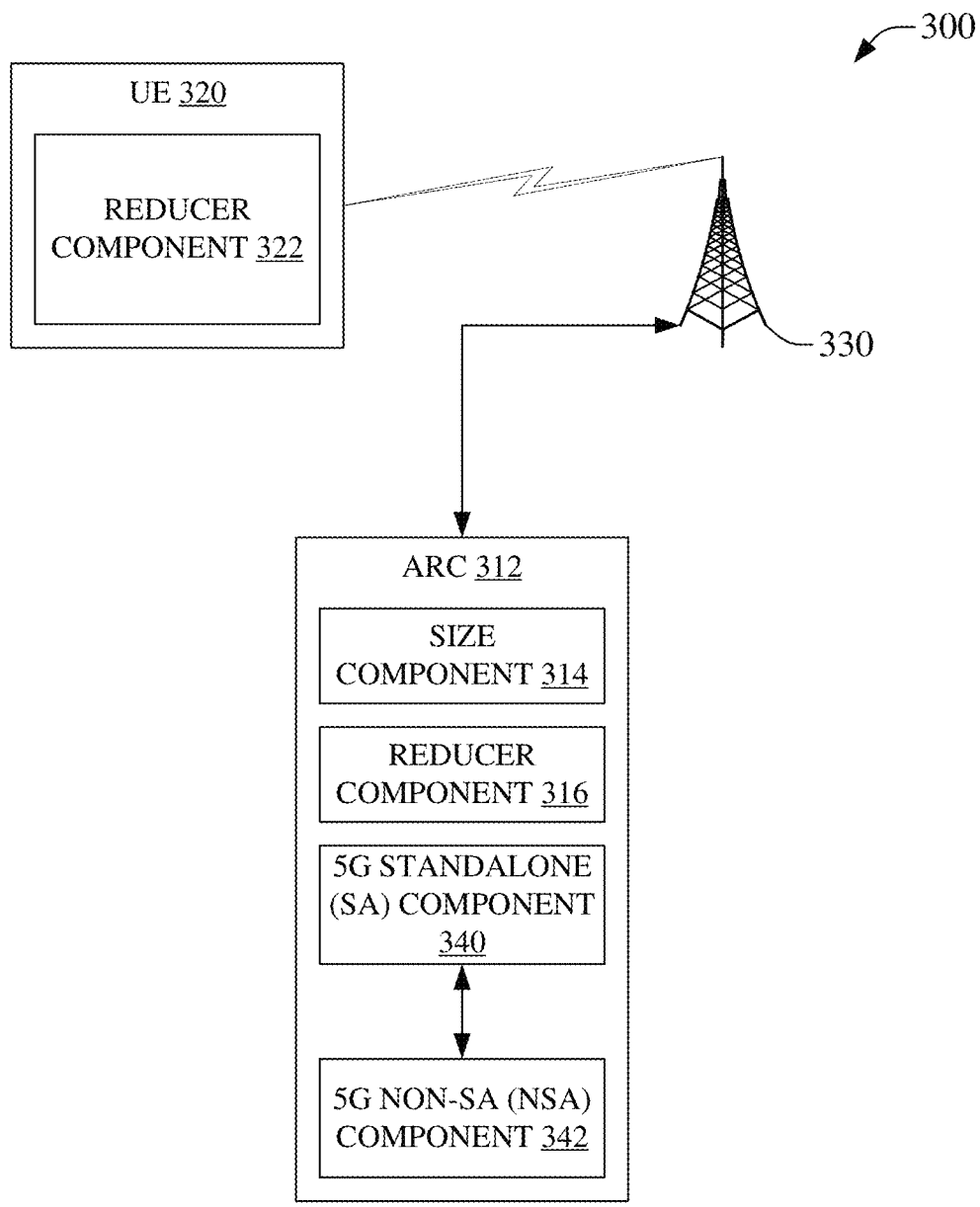
FIG. 3 is an illustration of an example system that can enable adaptive user equipment capability reporting supporting a non-standalone connection, in accordance with aspects of the subject disclosure.

FIG. 3 is an illustration of a system 300, which can facilitate adaptive user equipment capability reporting supporting a non-standalone connection, in accordance with aspects of the subject disclosure. System 300 can comprise ARC 312 that can be comprised in a core network operated by an MNO. UE 320 can employ a wireless connection for communications via RAN component 330 to a mobile network. Accordingly, in example system 300, UE 320 can wirelessly connect to a MNO network via RAN component 330. As part of establishing the wireless connection, UE 320 can transmit a UE capability report. ARC 312 can enable adaptive UE capability reporting. Implementation of a connection(s) to UE 320 can be based on reported UE capabilities.

UE capability reporting messages can generally be limited to a designated maximum size, such as by a standards organization. In modern mobile networks a more oversized UE capability reports can occur due to the ongoing development of wireless technologies making more RATs, channels of RATs, etc., available. Oversized UE capability reports can result in loss of some UE capability information via indiscriminate truncation of an oversize report. ARC 312 can provide an indication of reduced UE capability reporting. The indication can be based on determining that a UE capability report exceeds a designated size threshold. This determination can be made at size component 314. In this regard, UE capability reports that are not determined to be oversized by size component 314 can be employed in the conventional manner, e.g., if the message isn't oversized, the network is already typically designed to accept a size-compliant UE capability report. However, where size component 314 determines that a UE capability report is oversized, based on a threshold report size, then ARC 312 can indicate reduced UE capability reporting that can result in generation of an adapted UE capability report.

In some embodiments, reducer component 316 of ARC 312 can signal the UE to transmit an adapted UE capability report that can be smaller than a previous UE capability report, e.g., the indicating reduced UE capability reporting can cause reducer component 316 to signal UE to transmit an adapted UE capability report that can comprise less capability information than the UE capability report that caused the indicating of the reduced UE capability reporting. An adapted UE capability report can be generated by reducer component 322 of UE 320. Reducer component 322, for example, can receive the indication of reduced UE capacity reporting from reducer component 316, size component 314, ARC 312, etc., and in response, can generate the adapted UE capability report. It is noted that an adapted report can comprise preferred UE capability information, e.g., information that can identify preferred UE capabilities. This can result in the adapted report being smaller than the oversized report while still indicating preferred UE capabilities. This also avoids the adapted report being the same as, or similar to, core 310 merely truncating the oversized report without consideration of preferred UE capabilities, as is discussed elsewhere herein.

In some embodiments, reducer component 316 of ARC 312 can generate an adapted UE capability report based on the received oversized UE capability report. In these embodiments, the UE can communicate oversized reports that can be managed on the carrier-side components, e.g., via reducer component 316, etc., to generate a smaller, size-compliant, adapted UE capability report that can then be employed by other network components as a size-compliant UE capability report. This can be understood as ARC 312 intercepting an oversized report and generating, via reducer component 316, an adapted report to substitute for the oversized report. Reducer component 316 can populate an adapted report with preferred UE capabilities based on the oversized report. As such, the resulting adapted report can comprise preferred UE capabilities that may have been lost where the oversized report would be conventionally just truncated upon reaching a threshold size. In various embodiments of the disclosed subject matter, as previously noted, learning tools, e.g., artificial intelligence (AI) technology, machine learning (MI) technology, deep learning technology, etc., can be employed to determine preferred UE capabilities. In some embodiments, this can be performed via reducer component 316, via other unillustrated components of ARC 312, etc. In some embodiments this can be performed via a UE-side processor. In other embodiments, learning tools can be employed by both carrier-side and UE-side processors.

In some embodiments, an adapted report can identify UE resources according to a technological generation, e.g., 4G LTE capabilities can be separated from 5G NR capabilities in an adapted UE capability report. Moreover, ARC 312 can facilitate switching between a standalone (SA) configuration and a non-standalone (NSA) configuration of connections(s) between a UE and a mobile network. In this regard, an SA configuration, for example, can employ only 5G NR capabilities via 5G SA component 316. Similarly, a NSA configuration can provide some 5G features via 4G LTE capabilities via 5G NSA component 342. NSA configurations determined by 5G NSA component 342 can generally employ carrier aggregation (CA) technology. As such, determining preferred UE capabilities, for example via a learning tool, can comprise determining a preference for UE resources that can facilitate employment of more component carriers (CCs) and more multiple input-multiple output (MIMO) layers. In an embodiment, 5G SA component 340 can indicate release of a 5G NR connection to 5G NSA component 342, which can cause 5G NSA component 342 to determine a 5G NSA configuration that can enable establishing a connection(s) that can rely on more CCs and MIMO layers than would typically be identified in an adapted UE capability report that was not intelligently determined to include more preferred UE capabilities, e.g., use of learning tools can result in improved NSA configurations due to favoring inclusion of more CCs and MIMO layers compared to a more blunt selection tool for determining an adapted UE capability report.

Figure 4:
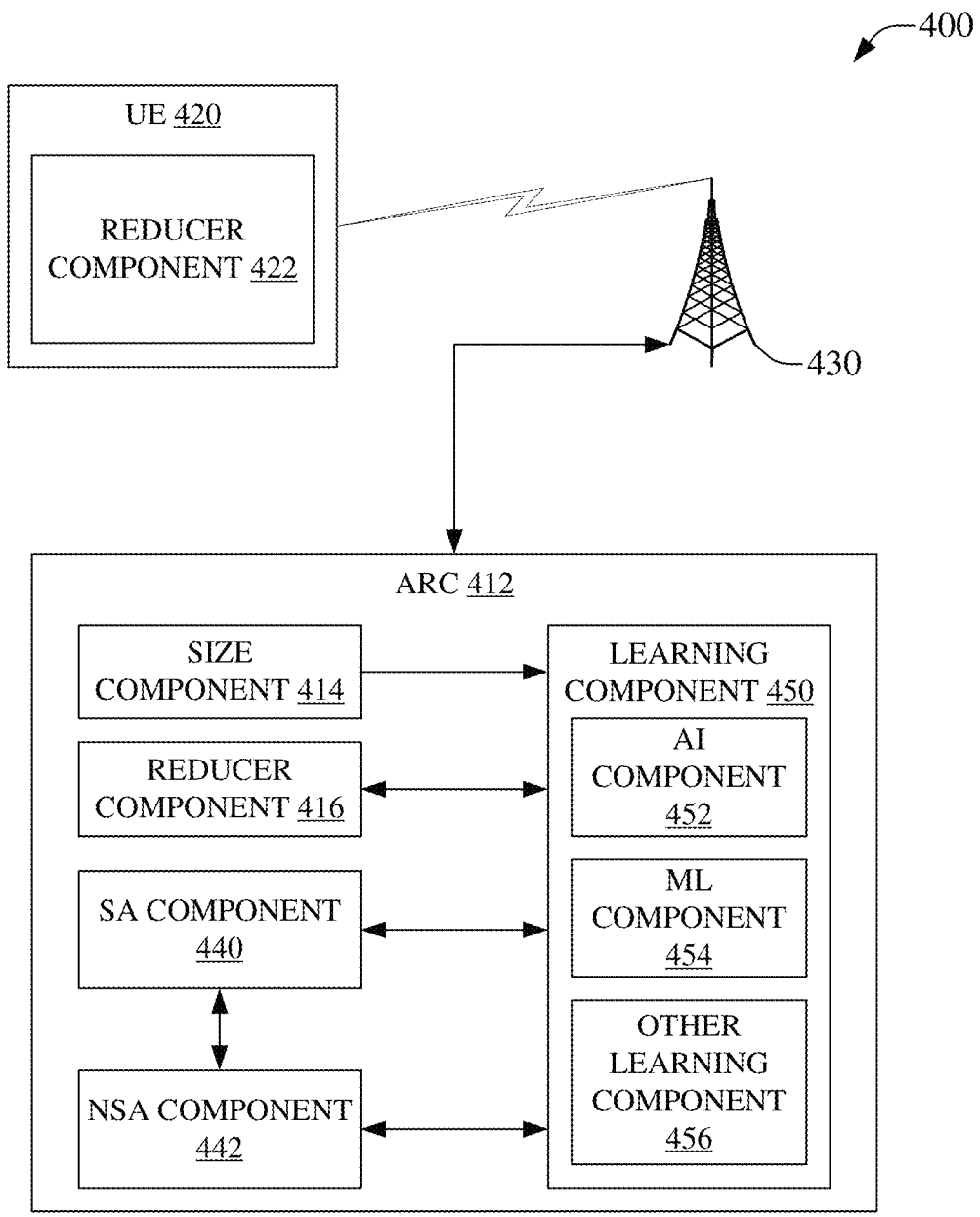
FIG. 4 illustrates an example system that can facilitate adaptive user equipment capability reporting employing a carrier-side learning tool, in accordance with aspects of the subject disclosure.

FIG. 4 is an illustration of a system 400, which can enable adaptive user equipment capability reporting employing a carrier-side learning tool, in accordance with aspects of the subject disclosure. System 400 can comprise ARC 412 that can be comprised in a core network operated by an MNO. UE 420 can employ a wireless connection for communications via RAN component 430 to a mobile network. Accordingly, in example system 400, UE 420 can wirelessly connect to a MNO network via RAN component 430. As part of establishing the wireless connection, UE 420 can transmit a UE capability report. ARC 412 can enable adaptive UE capability reporting. Implementation of a connection(s) to UE 420 can be based on reported UE capabilities.

UE capability reporting messages can generally be limited to a designated maximum size, such as by a standards organization. In modern mobile networks more oversized UE capability reports can occur due to the ongoing development of wireless technologies making more RATs, channels of RATs, etc., available. Oversized UE capability reports can result in loss of some UE capability information via indiscriminate truncation of an oversize report. ARC 412 can provide an indication of reduced UE capability reporting. The indication can be based on determining that a UE capability report exceeds a designated size threshold. This determination can be made at size component 414. In this regard, UE capability reports that are not determined to be oversized by size component 414 can be employed in the conventional manner, e.g., if the message isn't oversized, the network is already typically designed to accept a size-compliant UE capability report. However, where size component 414 determines that a UE capability report is oversized, based on a threshold report size, then ARC 412 can indicate reduced UE capability reporting that can result in generation of an adapted UE capability report.

In some embodiments, reducer component 416 of ARC 412 can signal the UE to transmit an adapted UE capability report that can be smaller than a previous UE capability report, e.g., the indicating reduced UE capability reporting can cause reducer component 416 to signal UE to transmit an adapted UE capability report that can comprise less capability information than the UE capability report that caused the indicating of the reduced UE capability reporting. An adapted UE capability report can be generated by reducer component 422 of UE 420. Reducer component 422, for example, can receive the indication of reduced UE capacity reporting from reducer component 416, size component 414, ARC 412, etc., and in response, can generate the adapted UE capability report. It is noted that an adapted report can comprise preferred UE capability information, e.g., information that can identify preferred UE capabilities. This can result in the adapted report being smaller than the oversized report while still indicating preferred UE capabilities. This also avoids the adapted report being the same as, or similar to, core 410 merely truncating the oversized report without consideration of preferred UE capabilities, as is discussed elsewhere herein.

In some embodiments, reducer component 416 of ARC 412 can generate an adapted UE capability report based on the received oversized UE capability report. In these embodiments, the UE can communicate oversized reports that can be managed on the carrier-side components, e.g., via reducer component 416, etc., to generate a smaller, size-compliant, adapted UE capability report that can then be employed by other network components as a size-compliant UE capability report. This can be understood as ARC 412 intercepting an oversized report and generating, via reducer component 416, an adapted report to substitute for the oversized report. Reducer component 416 can populate an adapted report with preferred UE capabilities based on the oversized report. As such, the resulting adapted report can comprise preferred UE capabilities that may have been lost where the oversized report would be conventionally just truncated upon reaching a threshold size.

In various embodiments of the disclosed subject matter, as previously noted, learning tools can be employed to determine preferred UE capabilities, e.g., via learning component 450. Accordingly, learning component 450 can comprise one or more of AI component 452 that can apply artificial intelligence to aid in determining preferable UE capabilities, ML component 454 that can apply machine learning to aid in determining preferable UE capabilities, other learning component 456 that, for example, can apply deep learning to aid in determining preferable UE capabilities, etc. In some embodiments, learning component 450 can be connected to one or more of size component 414, for example to receive size information corresponding to a received UE capability report, reducer component 416 to cooperate in generating an adapted UE capability report that, for example, can be based on a preferred UE capability, SA component 440 to aid in implementing a SA configuration corresponding to an adapted UE capability report, NSA component 442 to aid in implementing a NSA configuration corresponding to an adapted UE capability report, etc. In some embodiments learning component can be comprised in UE 420 and can execute via a UE-side processor. In other embodiments, learning component 450 and another learning component, e.g., learning component 560, etc., can be correspondingly employed by both carrier-side and UE-side processors.

In some embodiments, an adapted report can identify UE resources according to a technological generation, e.g., 4G LTE capabilities can be separated from 5G NR capabilities in an adapted UE capability report. Moreover, ARC 412 can facilitate switching between a standalone (SA) configuration and a non-standalone (NSA) configuration of connections(s) between a UE and a mobile network. This switching between SA and NSA configurations can be based on intelligent outputs from learning component 450, for example indicating preferred UE capabilities that can be represented in an adapted UE capability report. In this regard, an SA configuration, for example, can employ only 5G NR capabilities via 5G SA component 416. Similarly, a NSA configuration can provide some 5G features via 4G LTE capabilities via 5G NSA component 442. NSA configurations determined by 5G NSA component 442 can generally employ dual connectivity (DC) and carrier aggregation (CA) technology, which can be aided by determinations from learning component 450, e.g., selecting aggregation of CCs and MIMO layers that have historically performed better than other combinations of CCs and MIMO layers. As such, determining preferred UE capabilities, for example via a learning component 450, can comprise determining a preference for UE resources that can facilitate employment of more component carriers (CCs) and more multiple input-multiple output (MIMO) layers. In an embodiment, 5G SA component 440 can indicate release of a 5G NR connection to 5G NSA component 442, which can cause 5G NSA component 442 to determine a 5G NSA configuration that can enable establishing a connection(s) that can rely on more CCs and MIMO layers than would typically be identified in an adapted UE capability report that was not intelligently determined to include more preferred UE capabilities, e.g., use of learning tools can result in improved NSA configurations due to favoring inclusion of more CCs and MIMO layers compared to a more blunt selection tool for determining an adapted UE capability report.

Figure 5:
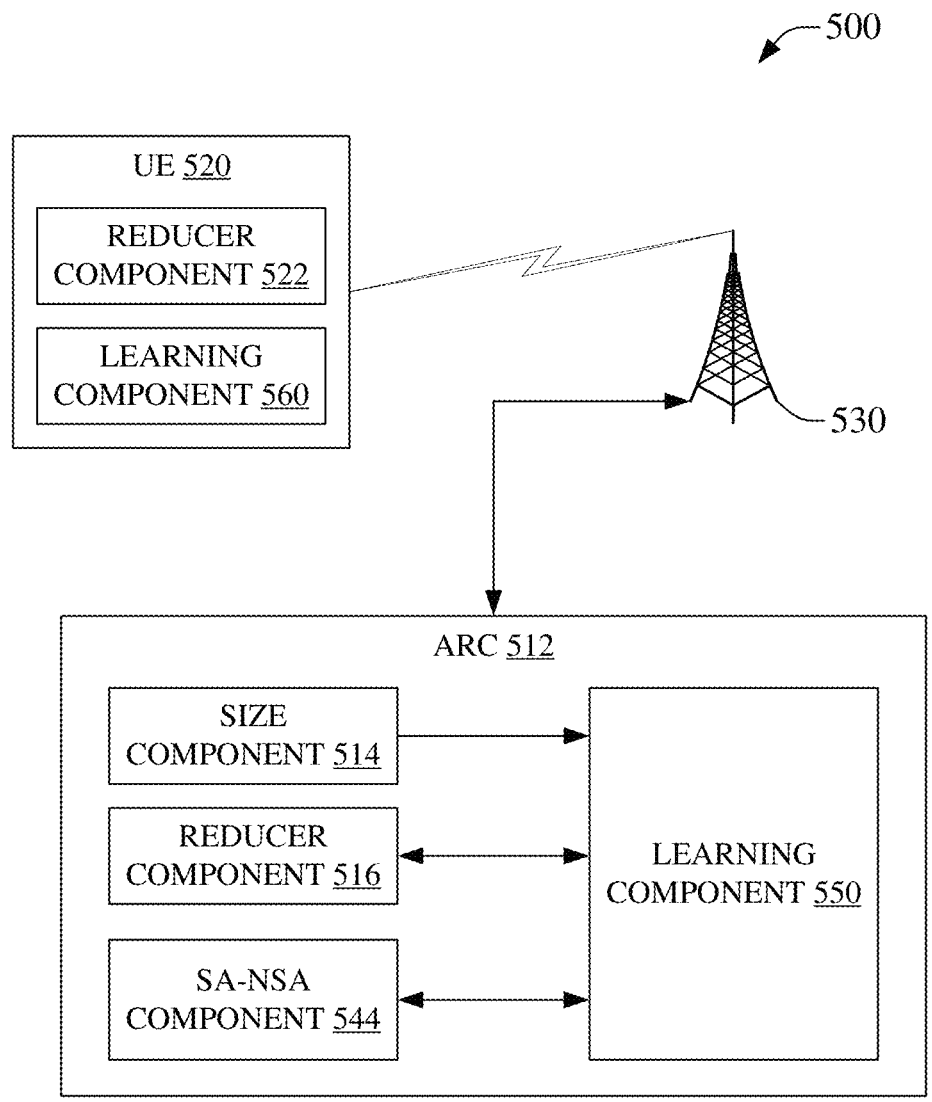
FIG. 5 illustrates an example system that can facilitate adaptive user equipment capability reporting employing a UE-side learning tool, in accordance with aspects of the subject disclosure.

FIG. 5 is an illustration of a system 500, which can support adaptive user equipment capability reporting employing a UE-side learning tool, in accordance with aspects of the subject disclosure. System 500 can comprise ARC 512 that can be comprised in a core network operated by an MNO. UE 520 can employ a wireless connection for communications via RAN component 530 to a mobile network. Accordingly, in example system 500, UE 520 can wirelessly connect to a MNO network via RAN component 530. As part of establishing the wireless connection, UE 520 can transmit a UE capability report. ARC 512 can enable adaptive UE capability reporting. Implementation of a connection(s) to UE 520 can be based on reported UE capabilities.

UE capability reporting messages can generally be limited to a designated maximum size, such as by a standards organization. In modern mobile networks more oversized UE capability reports can occur due to the ongoing development of wireless technologies making more RATs, channels of RATs, etc., available. Oversized UE capability reports can result in loss of some UE capability information via indiscriminate truncation of an oversize report. ARC 512 can provide an indication of reduced UE capability reporting. The indication can be based on determining that a UE capability report exceeds a designated size threshold. This determination can be made at size component 514. In this regard, UE capability reports that are not determined to be oversized by size component 514 can be employed in the conventional manner, e.g., if the message isn't oversized, the network is already typically designed to accept a size-compliant UE capability report. However, where size component 514 determines that a UE capability report is oversized, based on a threshold report size, then ARC 512 can indicate reduced UE capability reporting that can result in generation of an adapted UE capability report.

In some embodiments, reducer component 516 of ARC 512 can signal the UE to transmit an adapted UE capability report that can be smaller than a previous UE capability report, e.g., the indicating reduced UE capability reporting can cause reducer component 516 to signal UE to transmit an adapted UE capability report that can comprise less capability information than the UE capability report that caused the indicating of the reduced UE capability reporting. An adapted UE capability report can be generated by reducer component 522 of UE 520. Reducer component 522, for example, can receive the indication of reduced UE capacity reporting from reducer component 516, size component 514, ARC 512, etc., and in response, can generate the adapted UE capability report. Further, reducer component 522, in embodiments, can directly detect that an initial UE capability report can exceed a maximum size within UE 520 before transmitting the report to RAN component 530, which can cause adapting of the report to reduce the size of the report. It is noted that an adapted report can comprise preferred UE capability information, e.g., information that can identify preferred UE capabilities. This can result in the adapted report being smaller than the oversized report while still indicating preferred UE capabilities. This also avoids the adapted report being the same as, or similar to, core 510 merely truncating the oversized report without consideration of preferred UE capabilities, as is discussed elsewhere herein.

In some embodiments, reducer component 516 of ARC 512 can generate an adapted UE capability report based on the received oversized UE capability report. In these embodiments, the UE can communicate oversized reports that can be managed on the carrier-side components, e.g., via reducer component 516, etc., to generate a smaller, size-compliant, adapted UE capability report that can then be employed by other network components as a size-compliant UE capability report. This can be understood as ARC 512 intercepting an oversized report and generating, via reducer component 516, an adapted report to substitute for the oversized report. Reducer component 516 can populate an adapted report with preferred UE capabilities based on the oversized report. As such, the resulting adapted report can comprise preferred UE capabilities that may have been lost where the oversized report would be conventionally just truncated upon reaching a threshold size.

In various embodiments of the disclosed subject matter, as previously noted, learning tools can be employed to determine preferred UE capabilities, e.g., via learning component 550. Accordingly, learning component 550 can comprise one or more of AI component that can apply artificial intelligence to aid in determining preferable UE capabilities, ML component that can apply machine learning to aid in determining preferable UE capabilities, other learning component that, for example, can apply deep learning to aid in determining preferable UE capabilities, etc. In some embodiments, learning component 550 can be connected to one or more of size component 514, for example to receive size information corresponding to a received UE capability report, reducer component 516 to cooperate in generating an adapted UE capability report that, for example, can be based on a preferred UE capability, SA component 540 to aid in implementing a SA configuration corresponding to an adapted UE capability report, NSA component 542 to aid in implementing a NSA configuration corresponding to an adapted UE capability report, etc.

In some embodiments learning component 560 can be comprised in UE 520 and can execute via a UE-side processor. In some embodiments, learning component 560 can be employed in lieu of learning component 550. In other embodiments, learning component 550 and learning component 560 can operate contemporaneously, e.g., learning components 550 and 560 can work cooperatively to determine preferred UE capabilities and can be correspondingly employed by both carrier-side and UE-side processors. In an example of these embodiments learning component 560 can determine, based on learning technologies, which UE capabilities are preferred for improved UE performance while contemporaneously, learning component 550 can determine which UE capabilities are expected to perform well for the given area of network coverage that corresponds to the UE, such as based on historical connection performance. These example UE capability preferences can be coordinated in an adapted UE capability report.

In some embodiments, an adapted report can identify UE resources according to a technological generation, e.g., 4G LTE capabilities can be separated from 5G NR capabilities in an adapted UE capability report. Moreover, ARC 512 can facilitate switching between a standalone (SA) configuration and a non-standalone (NSA) configuration of connections(s) between a UE and a mobile network. This switching between SA and NSA configurations can be based on intelligent outputs from learning component 550, 560, etc., for example indicating preferred UE capabilities that can be represented in an adapted UE capability report. In this regard, an SA configuration, for example, can employ only 5G NR capabilities via 5G SA component 516. Similarly, a NSA configuration can provide some 5G features via 4G LTE capabilities via 5G NSA component 542. NSA configurations determined by 5G NSA component 542 can generally employ carrier aggregation (CA) technology, which can be aided by determinations from learning component 550, 560, etc., e.g., selecting aggregation of CCs and MIMO layers that have historically performed better than other combinations of CCs and MIMO layers. As such, determining preferred UE capabilities, for example via a learning component 550, 560, etc., can comprise determining a preference for UE resources that can facilitate employment of more component carriers (CCs) and more multiple input-multiple output (MIMO) layers. In an embodiment, 5G SA component 540 can indicate release of a 5G NR connection to 5G NSA component 542, which can cause 5G NSA component 542 to determine a 5G NSA configuration that can enable establishing a connection(s) that can rely on more CCs and MIMO layers than would typically be identified in an adapted UE capability report that was not intelligently determined to include more preferred UE capabilities, e.g., use of learning tools can result in improved NSA configurations due to favoring inclusion of more CCs and MIMO layers compared to a more blunt selection tool for determining an adapted UE capability report.

Figure 6:
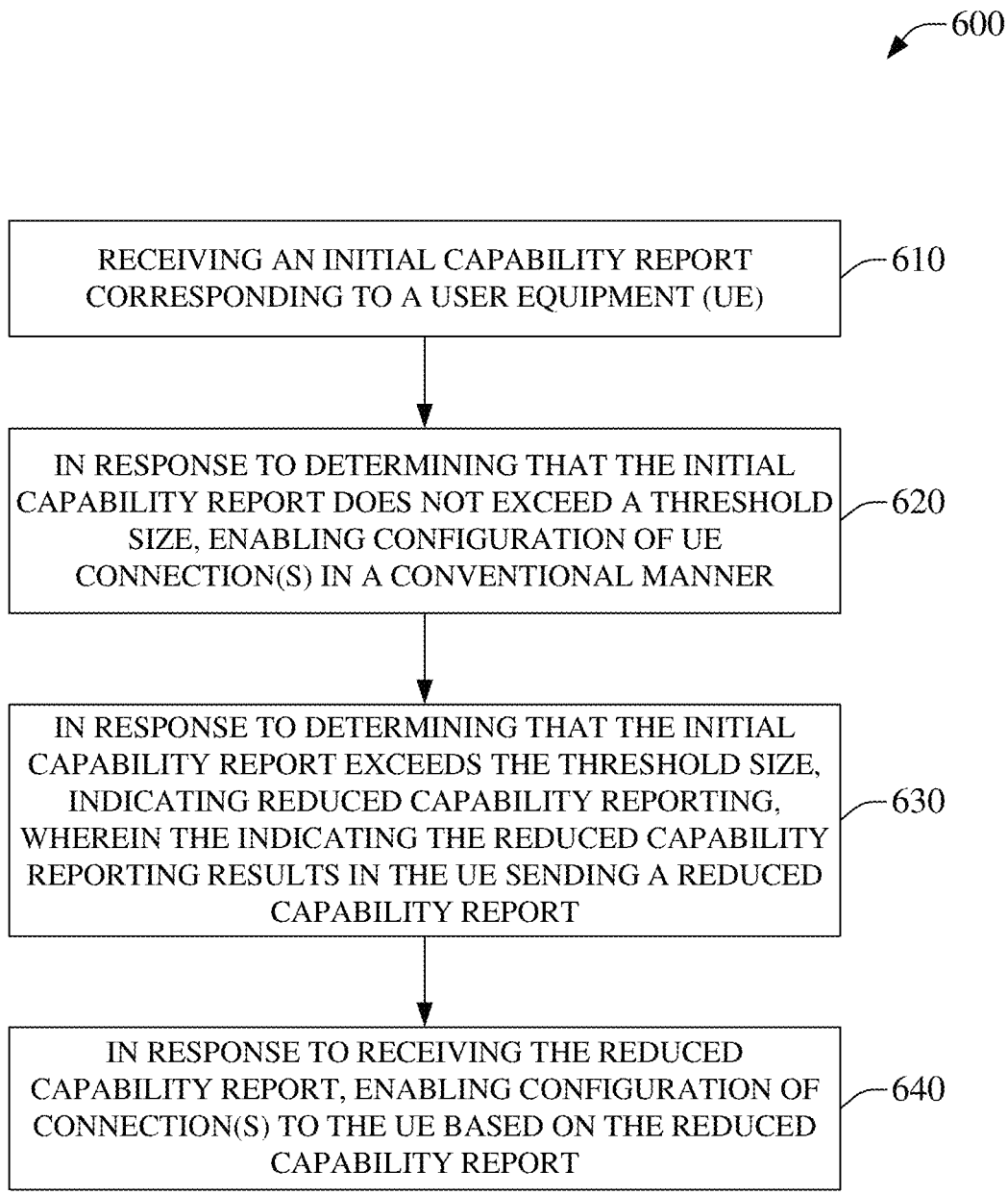
FIG. 6 is an illustration of an example method, enabling adaptive user equipment capability reporting, in accordance with aspects of the subject disclosure.
Figure 7:
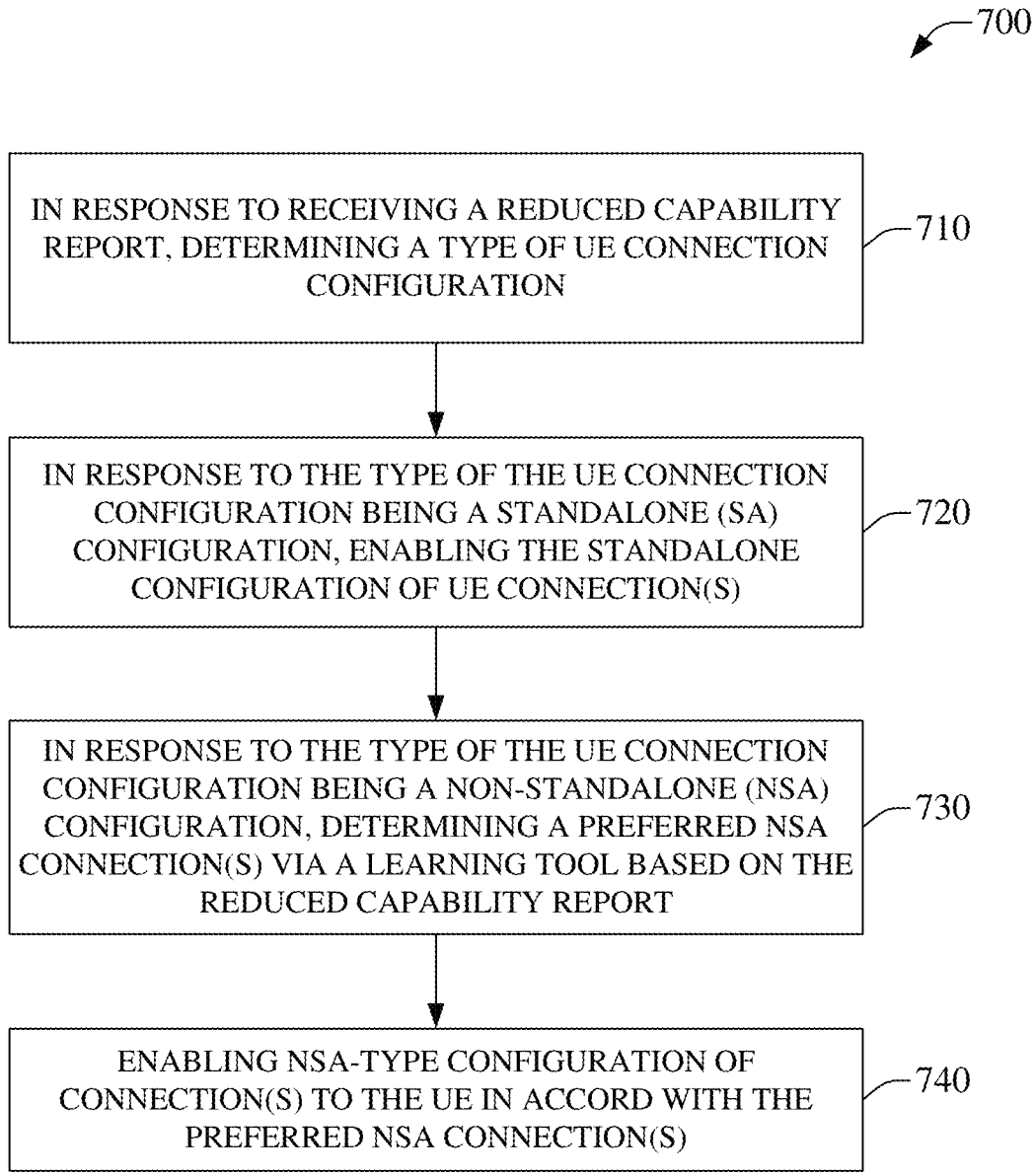
FIG. 7 illustrates an example method, facilitating adaptive user equipment capability reporting for a non-standalone connection with the UE, in accordance with aspects of the subject disclosure.
Figure 8:
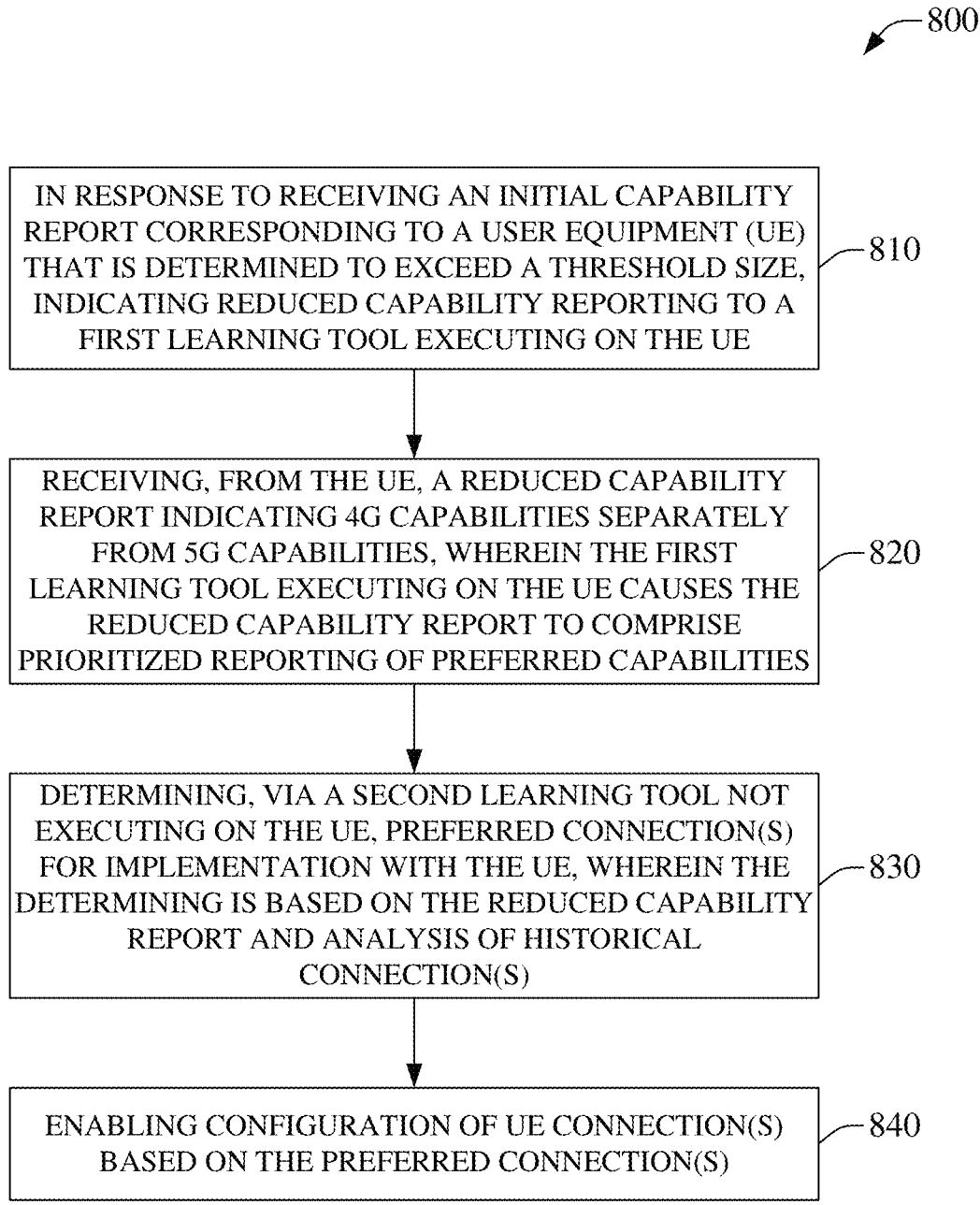
FIG. 8 illustrates an example method, enabling adaptive user equipment capability reporting based on selection of a preferred connection (s) determined via a learning tool, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which can facilitate adaptive user equipment capability reporting, in accordance with aspects of the subject disclosure. At 610, method 600 can comprise receiving an initial capability report corresponding to a user equipment (UE). A mobile network standard can designate a UE capability report size limit. A typical example of UE capability reporting size limit can be 8 kb, e.g., as is currently designated by the 3rd Generation Partnership Project (3GPP) at 36.331. The increasing number of radio access technologies (RATs) being deployed make it increasingly common for UEs trying to report available capabilities to generate UE capability reports that can exceed a threshold size limit. In this regard, UEs listing many channels across many RATs can result in overly long UE capability reports. When an oversize UE capability report is communicated, the oversize UE capability report can result in loss of some capability information or can require modification to network components that can cause the network to be non-standardized. Adaptive UE capability reporting, as disclosed herein, can provide improvements to the current state of the art in regard to UE capability reporting and can avoid non-standardized modifications to a network while accommodating reporting of prioritized UE capability information.

At 620, method 600 can comprise enabling configuration of UE connection(s) in a conventional manner in response to determining that the initial capability report does not exceed a threshold size. While there can be in increase in the occurrences of oversized UE capability reports, accommodating size-conforming UE capability reports can be supported. Receiving a size-conforming UE capability report does not cause indication of reduced UE capability reporting and the conforming UE capability report can be in the conventional manner.

Method 600, at 630, can comprise, in response to determining that the initial capability report exceeds the threshold size, indicating reduced capability reporting, wherein the indicating the reduced capability reporting results in the UE sending a reduced capability report. UE capability reports that do not conform to a size standard, e.g., the UE capability report being larger than a threshold size, can trigger reduced UE capability reporting. Indicating reduced UE capability reporting can result in a UE sending an adapted UE capability report that can be smaller than an oversized UE capability report. In some embodiments, the adapted UE capability report can comprise preferred UE capability information. Preferred UE capability information can be determined, for example, by applying learning tools, e.g., AI, ML, deep learning, etc., to UE capabilities to select preferred UE capabilities to be reported via an adapted UE capability report. This can result, for example, in listing preferred UE capabilities higher in a list or UE capabilities such that truncation of the capabilities listed so that the adapted UE capability report is size compliant, can remove less preferred UE capabilities, e.g., preferred UE capabilities can be reported with more reliability in an adapted UE capability report. In some embodiments, the UE can determine the adapted UE capability report in response to the indicating reduced UE capability reporting. In some embodiments, a carrier-side component can determine an adapted UE capability report in response to the indicating reduced UE capability reporting, e.g., a received oversized report can be used to determine an adapted report on carrier-side components, whereby the adapted report can then be substituted for the oversized report.

Method 600, at 630, can comprise, enabling, in response to receiving the reduced capability report, configuration of connection(s) to the UE based on the reduced capability report. At this point, method 600 can end. A received adapted UE capability report, e.g., a reduced capability report, can enable selection of UE capabilities for implementation in connection(s) between the UE and a RAN of a wireless network. As an example, carrier aggregation (CA) can employ channels indicated in the adapted UE capability report in connection(s) between the UE and the RAN.

FIG. 7 illustrates example method 700 that facilitates adaptive user equipment capability reporting for a non-standalone connection with the UE, in accordance with aspects of the subject disclosure. Method 700, at 710, can comprise, in response to receiving a reduced capability report, determining a type of UE connection configuration. As an example, a type of UE connection can be a standalone 5G connection(s), a non-standalone connection(s), etc. As such, separation of types of UE capabilities in a reduced capacity report can be helpful in facilitating implementation of different types of connection(s) of a UE to a RAN. In embodiments of the disclosed subject matter an adapted UE capability report, e.g., a reduced UE capability report, etc., can separate indications of different types of UE capabilities, such as separating 3G capabilities, 4G capabilities, 5G capabilities, 6G capabilities, WI-FI capabilities, BLU-ETOOTH capabilities, etc. In this regard, rather than having various types of UE capabilities intermixed in a report, the separation can facilitate selection or UE capabilities by type. Moreover, learning tools can be applied to prioritize different types of UE capabilities in a report, e.g., 5G can be listed earlier than 4G, which can be listed earlier than 3G, etc. In this regard, preferred types, and in some embodiments preferred capabilities within a type or preferred type, can be listed earlier in a report such that an adapted report that cannot fit all possible UE capabilities into a size-compliant report is more likely to preserve reporting for preferred types of capabilities and/or preferred capabilities of a type or preferred type of UE capability. Moreover, in some embodiments, capabilities within a type can be limited to preferred capabilities, which can facilitate retaining preferred capabilities across various UE capability types in a size-compliant adapted report. As an example, an adapted report can list up to twenty preferred 5G capabilities, up to ten 4G capabilities, etc. In this example, if there are twenty 5G and fifty 4G capabilities, and listing more than twenty total capabilities would cause the resulting report to be oversized, then a first adapted report can list the ten most preferred 5G capabilities and the ten most preferred 4G capabilities of the UE. Alternatively, in this example, a second adapted report can list fifteen 5G capabilities and five 4G capabilities. Other examples are readily appreciated and are considered within the scope of the instant disclosure even where not explicitly recited for the sake of clarity and brevity. Accordingly, to form a 5G standalone connection, the reporting of 5G UE capabilities in a reduced UE capability report can be important and conventional truncation of an oversized UE capability report can result in missing UE capabilities that can result in a less optimal 5G SA configured connection of the UE and the RAN. The adapted report, by prioritizing, in an example, 5G capabilities can therefore better ensure that sufficient higher priority 5G capabilities are indeed reported to enable a more optimal 5G SA configuration. Again, other examples are readily appreciated and are considered within the scope of the instant disclosure even where not explicitly recited for the sake of clarity and brevity.

At 720, method 700 can comprise, in response to the type of the UE connection configuration being a standalone (SA) configuration, enabling the standalone configuration of UE connection(s). Where the type of a desired UE connection will be according to a SA configuration, the reduced UE capacity report that can prioritize UE capabilities corresponding to a SA-type connection(s). Accordingly, an SA configuration can be implemented to cause SA-type connections between the UE and a RAN. As noted previously, the SA-type capabilities can be prioritized by type and/or by capability within the type or preferred type. Moreover, the reduced UE capability report can limit a number of capabilities indicated within a type or preferred type. As such, in an example, preference for SA-type capabilities can result in a higher likelihood that these SA-type capabilities will be successfully report rather than being lost in a conventional truncation process. As such, the likelihood of a SA-type connection being formed can be higher than in conventional systems where truncation of oversized UE capability reports occurs.

Method 700, at 730, can comprise, in response to the type of the UE connection configuration being a Non-standalone (NSA) configuration, determining a preferred NSA connection(s) via a learning tool based on the reduced capability report. Where the type of a desired UE connection will be according to a NSA configuration, the reduced UE capacity report that can prioritize UE capabilities corresponding to a NSA-type connection(s). Accordingly, an NSA configuration can be implemented, for example where an SA connection is released, to cause a NSA-type connection(s) between the UE and a RAN. Similar to SA-type capability prioritization, NSA-type capabilities can also be prioritized by type and/or by capability within the type or preferred type. As such, the reduced UE capability report can limit a number of capabilities indicated within a type or preferred type. As such, in an example, preference for some SA-type and some NSA-type capabilities can result in a higher likelihood that preferred SA-type and NSA-type capabilities will be successfully reported rather than being lost in a conventional truncation process. For example, listing some SA and some NSA capabilities in a size-compliant adapted UE capability report can result in both SA and NSA capabilities being reported. This can be contrasted with truncation of an oversized report that can, for example, list so many NSA capabilities that SA capabilities end up being comprised in a truncated part of the oversized report, which can result in a network not being able to identify any SA capabilities in this example. As such, use of the reduced UE capability report that intelligently prioritizes preferred types and/or capabilities in a type or preferred type, can increase a likelihood of SA and NSA capabilities being reported, such that an NSA connection can be formed with higher likelihood than compared to conventional systems where truncation of oversized UE capability reports occurs.

Method 700, at 740, can comprise enabling NSA-type configuration of connection(s) to the UE in accord with the preferred NSA connection(s). At this point, method 700 can end. Based on receiving the reduced UE capability report, e.g., an adapted UE capability report, selection of preferred UE capabilities can be facilitated to enable implementation of NSA-type, or SA-type, connection(s) between the UE and a RAN of a wireless network. As an example, carrier aggregation (CA) can employ NSA-type 4G channels indicated in the adapted UE capability report in connection(s) between the UE and the RAN to enable 5G functionality over 4G resources.

FIG. 8 illustrates example method 800 enabling adaptive user equipment capability reporting based on selection of a preferred connection (s) determined via a learning tool, in accordance with aspects of the subject disclosure. Method 800, at 810, can comprise, in response to Receiving an initial capability report corresponding to a user equipment (UE) that is determined to exceed a threshold size, indicating reduced capability reporting to a first learning tool executing on the UE. Learning tools, e.g., AI, ML, deep learning, etc., can be applied to generate a reduced capacity report, e.g., an adapted UE capability report, which can comprise preferred UE capabilities that could be lost where conventional truncation of an oversized UE capability report occurs. Indication of reduced capability reporting can occur in response to determining that a UE capability report is oversized. This indicating reduced capability reporting to a first learning tool can enable selection of preferred UE capabilities for inclusion in a reduced capability report. In embodiments, the first learning tool can be comprised in a UE or other UE-side component. In an example, a UE can send an oversized report causing a network component to indicate reduced capacity reporting. The example indication of reduced capacity reporting can cause the first learning tool of the UE to indicate preferred UE capabilities to be included in a reduced UE capability report generated by the UE, which can then be sent to the example network.

Method 800, at 820, can comprise receiving, from the UE, a reduced capability report indicating 4G capabilities separately from 5G Capabilities, wherein the first learning tool executing on the UE causes the reduced capability report to comprise prioritized reporting of preferred capabilities. The reduced capability report can comprise preferred UE capabilities, which can include segregation of preferred UE capability types, e.g., separating 3G, 4G, 5G, 6G, etc., types in the reduced capability report. The first learning tool can facilitate reporting preferred UE capabilities in types or preferred types of capabilities included in the reduced capability report. As an example, twenty 5G capabilities and fifty 4G capabilities can be reported, wherein the 5G and 4G capabilities are not intermingled but are rather separate into different type-groups in the reduced capability report.

At 830, method 800 can comprise determining, via a second learning tool not executing on the UE, preferred connection(s) for implementation with the UE, wherein the determining is based on the reduced capability report and analysis of historical connection(s). A network component can perform a second learning tool that can intake the reduced capability report and can select UE capabilities that can be preferred by the network components. As an example, for a first region of network coverage, historical connections can be better for 4G than for 5G connections. Accordingly, in this example, where the reduced UE capability report indicates preferred UE capabilities in both 4G and 5G capabilities, the second learning tool can indicate a preference to employ 4G-type capabilities.

At 840, method 800 can comprise enabling configuration of UE connection(s) based on the preferred connection(s). At this point, method 800 can end. Based on receiving the reduced UE capability report and applying a second learning tool, network selection of preferred UE capabilities can be facilitated to enable implementation a connection(s) between the UE and a RAN of a wireless network.

Figure 9:
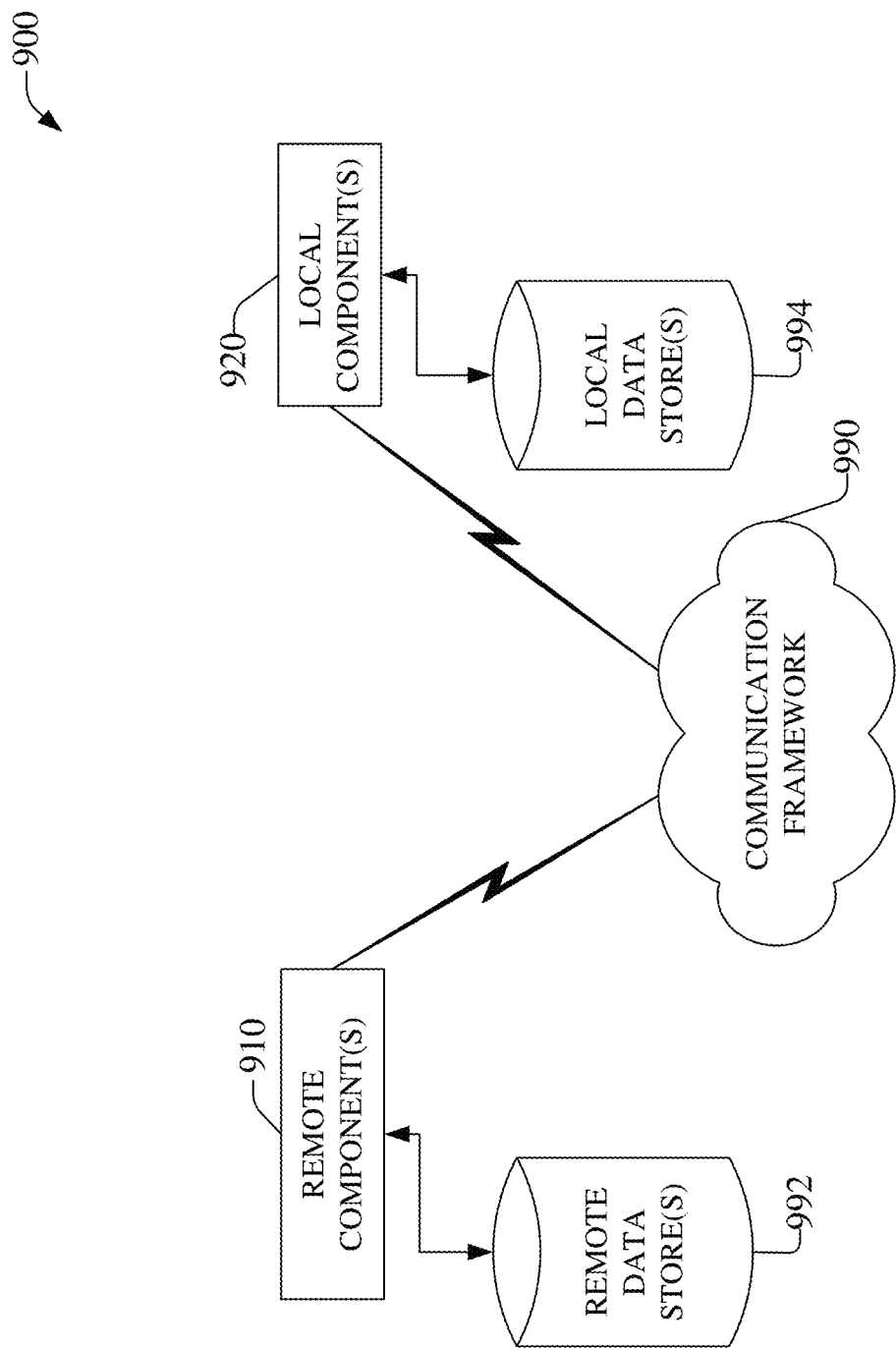
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise network core components 110, etc., RAN component(s) 130-530, etc., UE 220-520, etc., ARC 112-512, etc., learning component 450-550, etc., learning component 560, etc., reducer component 216-516, etc., reducer component 4312-512, etc., or any other component that is located remotely from another component of systems 100-500, etc.

The system 900 also comprises one or more local component(s) 920. The local component(s) 920 can be hardware and/or software (e.g., threads, processes, computing devices). In some embodiments, local component(s) 920 can comprise network core components 110, etc., RAN component(s) 130-530, etc., UE 220-520, etc., ARC 112-512, etc., learning component 450-550, etc., learning component 560, etc., reducer component 216-516, etc., reducer component 4312-512, etc., or any other component that is located local to another component of systems 100-500, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 990 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 992, such as a hard drive, solid state drive, SIM card, device memory, etc., that can be employed to store information on the remote component(s) 910 side of communication framework 990. Similarly, local component(s) 920 can be operably connected to one or more local data store(s) 994, that can be employed to store information on the local component(s) 920 side of communication framework 990. As an examples, a UE capability report can be stored at ARC 112 to facilitate determining an adapted UE capability report.

Figure 10:
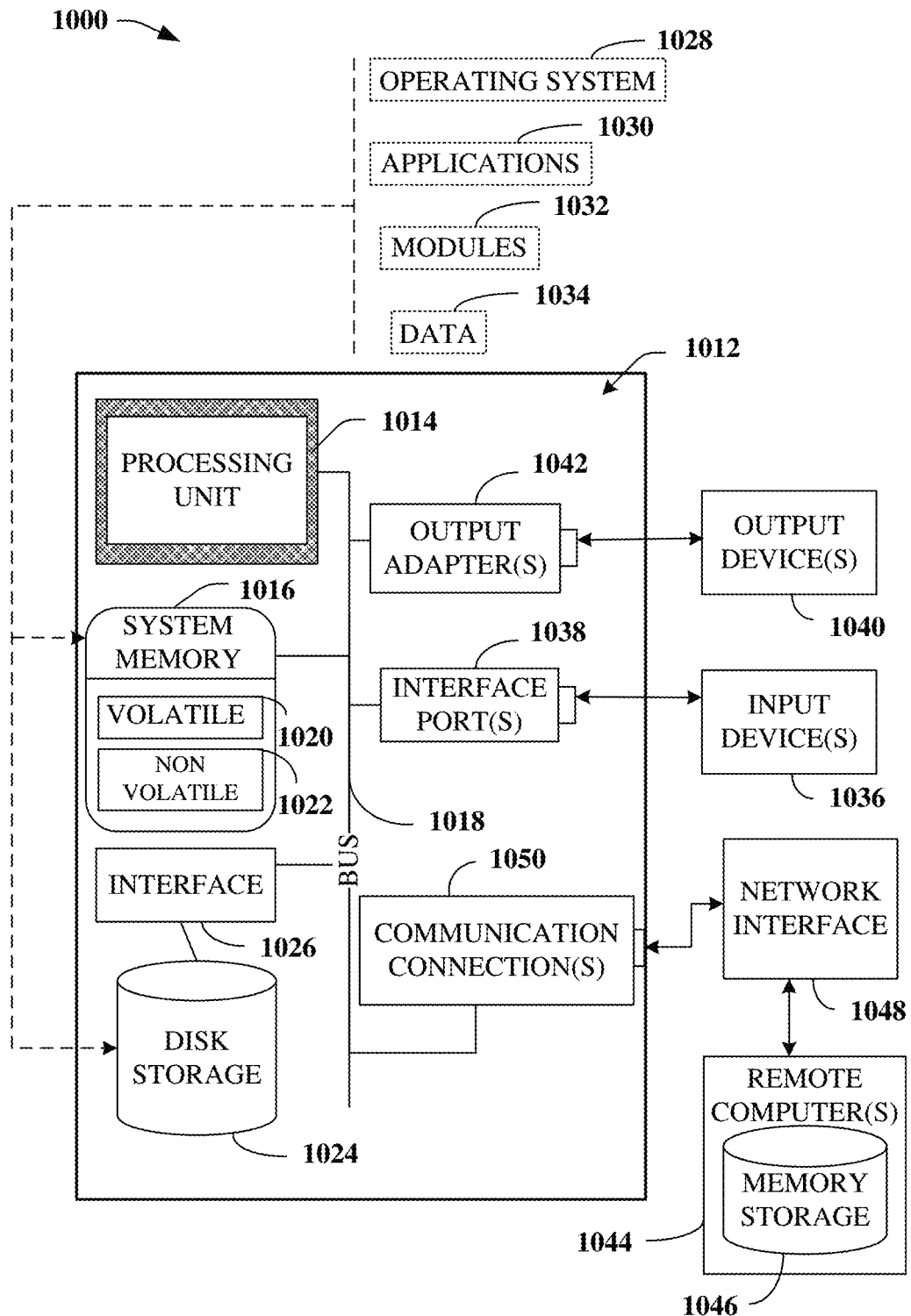
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random-access memory, synchronous dynamic random-access memory, double data rate synchronous dynamic random-access memory, enhanced synchronous dynamic random-access memory, SynchLink dynamic random-access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in network core components 110, etc., RAN component(s) 130-530, etc., UE 220-520, etc., ARC 112-512, etc., learning component 450-550, etc., learning component 560, etc., reducer component 216-516, etc., reducer component 4312-512, etc., or any other component of systems 100-500, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random-access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory, or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory, or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries, or other data retrieval protocols, for a variety of operations with respect to the information stored by the medium. As such, for example, a computer-readable medium can comprise executable instructions stored thereon that, in response to execution, can cause a system comprising a processor to perform operations comprising receiving a first user equipment capability report and indicating a reduced user equipment capability reporting condition in response to determining that the first UE capability report transitions a threshold size. In response to the indicating the reduced user equipment capability reporting, receiving a second user equipment capability report corresponding to the user equipment, wherein the second user equipment capability report is does not transition the threshold size.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line-controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring, and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); sixth generation partnership project (6G or 6GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength (λ) for millimeter waves is typically in the 1-mm to 10-mm range.

The term "infer", or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices, and drawings such terms are intended to be inclusive in a manner similar to the term "comprising" as "comprising" is interpreted when employed as a transitional word in a claim.

What is claimed is:

1. A device, comprising:
    a processor; and
    a memory that stores executable instructions that, when executed by the processor, facilitate performance of operations, the operations comprising:
        receiving a first user equipment capability report corresponding to a user equipment;
        in response to determining that the first user equipment capability report does not transition a threshold size, employing the first user equipment capability report in determining a network connection with the user equipment;
        in response to determining that the first user equipment capability report transitions the threshold size, generating an indication of a reduced user equipment capability reporting state; and
        receiving a second user equipment capability report corresponding to the user equipment in response to the indication, wherein the second user equipment capability report is smaller than the first user equipment capability report, wherein the second user equipment capability report is generated by the user equipment, wherein the second user equipment capability report is based on applying a learning tool to capabilities of the user equipment, wherein the learning tool performs an operation selected from a group of operations comprising an artificial intelligence operation, a machine learning operation, and a deep learning operation.

2. The device of claim 1, wherein the second user equipment capability report is based on applying the learning tool to the capabilities of the user equipment indicated in the first user equipment capability report.

3. The device of claim 1, wherein the second user equipment capability report segregates first capabilities of a first radio access technology from second capabilities of a second radio access technology.

4. The device of claim 1, wherein the operations further comprise:
    determining a preference value for a user equipment capability, and wherein the user equipment capability is included in the second user equipment capability report based on the preference value.

5. The device of claim 3, wherein the first radio access technology is a fourth-generation long term evolution technology operative according to a long term evolution communication protocol.

6. The device of claim 3, wherein the second radio access technology is a fifth-generation new radio technology operative according to a new radio communication protocol.

7. A method, comprising:
    receiving, by a system comprising a processor, a first user equipment capability report corresponding to a user equipment;
    in response to determining by the system that the first user equipment capability report transitions a threshold size, indicating a reduced user equipment capability reporting condition; and
    receiving, by the system in response to the indicating, a second user equipment capability report corresponding to the user equipment, wherein the second user equipment capability report does not transition the threshold size, wherein the receiving the second user equipment capability report comprises receiving the second user equipment capability report from the user equipment, wherein the second user equipment capability report is generated based on the user equipment applying a learning tool to capabilities of the user equipment, and wherein the learning tool performed an operation selected from a group of operations comprising an artificial intelligence operation, a machine learning operation, and a deep learning operation.

8. The method of claim 7, wherein the second user equipment capability report was generated based on application of the learning tool to the capabilities of the user equipment indicated in the first user equipment capability report.

9. The method of claim 7, wherein the receiving the second user equipment capability report comprises receiving the second user equipment capability report segregated according to a first portion pertaining to a first capability of a first radio access technology and a second portion pertaining to a second capability of a second radio access technology.

10. The method of claim 9, wherein the first radio access technology is a fourth-generation long term evolution technology operative according to a long term evolution communication protocol, and wherein the second radio access technology is a fifth-generation new radio technology operative according to a new radio communication protocol.

11. The method of claim 7, further comprising:
    determining a preference value for a user equipment capability, and wherein the user equipment capability is included in the second user equipment capability report based on the preference value.

12. A non-transitory machine-readable storage medium, comprising executable instructions that, when executed by a processor, facilitate performance of operations, the operations comprising:
   receiving a first user equipment capability report corresponding to a user equipment;
   indicating a reduced user equipment capability reporting condition in response to determining that a first size of the first user equipment capability report is at least a threshold size; and
   in response to the indicating the reduced user equipment capability reporting condition, receiving a second user equipment capability report corresponding to the user equipment, wherein a second size of the second user equipment capability report is less than the threshold size, wherein the second user equipment capability report is not generated by the user equipment, wherein the second user equipment capability report is based on the first user equipment capability report, and wherein the second user equipment capability report prioritizes reporting a user equipment capability of the first user equipment capability report that is determined to be a preferred user equipment capability based on a result of a learning tool operation.

13. The non-transitory machine-readable storage medium of claim 12, wherein the second user equipment capability report comprises a first report portion indicating a first capability of a first radio access technology and a second report portion indicating a second capability of a second radio access technology, and wherein the first report portion and the second report portion are not a same report portion.

14. The non-transitory machine-readable storage medium of claim 13, wherein the first radio access technology is a fourth-generation long term evolution technology operative according to a long term evolution communication protocol.

15. The non-transitory machine-readable storage medium of claim 13, wherein the second radio access technology is a fifth-generation new radio technology operative according to a new radio communication protocol.

16. The non-transitory machine-readable storage medium of claim 12, wherein the learning tool operation comprises an operation selected from a group of operations comprising an artificial intelligence operation, a machine learning operation, and a deep learning operation.

17. The non-transitory machine-readable storage medium of claim 12, wherein the second user equipment capability report is generated by a carrier-side device and is based on the first user equipment capability report.

18. The non-transitory machine-readable storage medium of claim 12, wherein the second user equipment capability report is received from a mobile network core equipment via a mobile network operated by a mobile network operator.

19. The non-transitory machine-readable storage medium of claim 18, wherein the mobile network core equipment generated the second user equipment capability report.

20. The non-transitory machine-readable storage medium of claim 12, the operations further comprising:
   determining a preference value for a user equipment capability, and wherein the user equipment capability is included in the second user equipment capability report based on the preference value.

* * * * *